Patented May 21, 1946

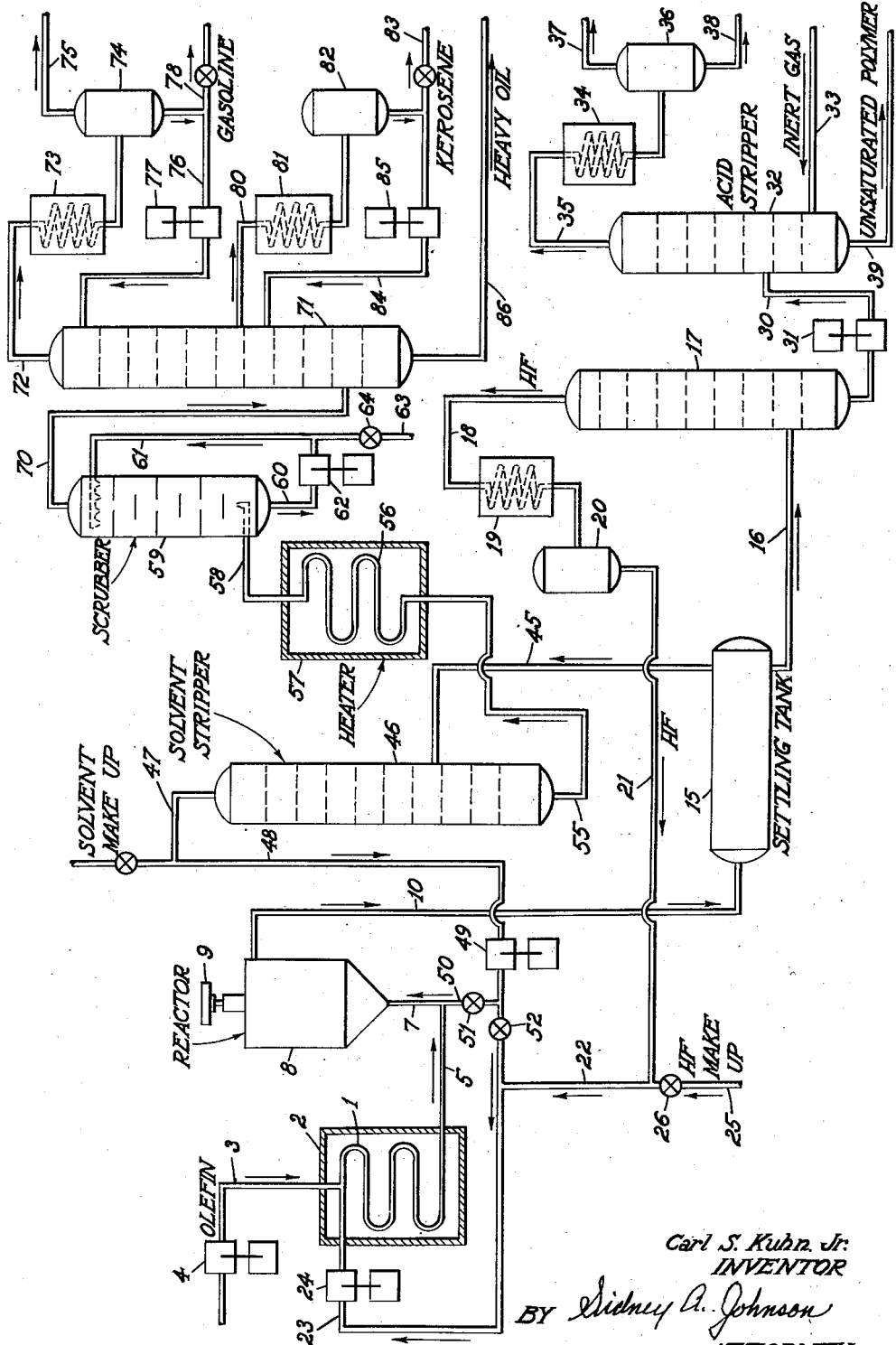

2,400,521

UNITED STATES PATENT OFFICE 2,400,521

OLEFIN POLYMERIZATION

Carl S. Kuhn, Jr., Dallas, Tex., assignor, by mesne assignments, to Socony-Vacuum Oil Company, Incorporated, New York, N. Y., a corporation of New York Application April 24, 1944, Serial No. 532,490

15 Claims. (Cl. 260—683.15)

This invention relates to the catalytic polymerization of mono-olefins of four or more carbon atoms and is a continuation-in-part of my copending application Serial Number 403,876, filed July 24, 1941. More specifically, the invention is concerned with a particular type of polymerization of mono-olefins for the simultaneous production of an essentially saturated liquid hydrocarbon product and a highly unsaturated liquid hydrocarbon product.

In the past mono-olefins have been polymerized under both thermal and catalytic conditions. For instance, in the catalytic operations, such catalysts as dilute sulfuric acid, various metallic halides, etc., have been used. Usually the products of such reactions have been olefin polymers which are linear dimers, trimers, etc., of the original olefin reactant. It also is known that under suitable conditions, certain catalysts, such as concentrated sulfuric acid and aluminum chloride, can effect a different type of polymerization of mono-olefins where there is obtained a top reactant layer consisting essentially of saturated liquid hydrocarbons and a bottom reactant layer which comprises terpene-like unsaturated hydrocarbons in combination with the catalyst. This latter type of polymerization apparently involves a hydrogen exchange between the primary polymerization products resulting in a saturation of one portion of the material at the expense of the other. For this reason the terms "hydro-polymerization," "dehydro-polymerization," and "conjunct polymerization" have been applied to this complex reaction to distinguish it from the ordinary polymerization. Therefore, the concentration of the acid must be sufficient to give conjunct polymerization, and this lower limit is about 90% acid. For the purposes of defining my invention I shall consider anhydrous hydrogen fluoride as hydrofluoric acid. Accordingly, my catalyst is one consisting essentially of anhydrous hydrofluoric acid containing not more than 10% of water by weight on the basis of the hydrogen fluoride content of the catalyst although the titratable acidity of the catalyst in the reaction zone may be considerably less than 90% due to the presence of dissolved hydrocarbons and highly unsaturated polymer product, which of course reduce the titratable acidity as well as water.

When an olefin is admixed with essentially anhydrous hydrogen fluoride at least two predominant primary reactions are possible, i. e., addition of hydrogen fluoride to the double bond of the olefin monomer to form volatile alkyl fluorides, and polymerization of the olefin monomer induced or accelerated by the catalytic effect of the hydrogen fluoride to the olefin dimer, trimer, tetramer, etc. Where the reaction is carried out in the presence of a normal paraffin hydrocarbon solvent a third primary reaction is theoretically possible, i. e., combination of the normal paraffin with the olefin by an alkylation reaction. Which of these reactions is the predominant one depends upon the reaction conditions used, and the reaction conditions necessary to favor a particular reaction will in turn vary with the particular olefin utilized.

I have found that, in addition to the concentration of the catalyst, the temperature and the hydrofluoric acid to olefin monomer ratio exert an important effect in determining the nature of the reaction. Since my invention is concerned with the formation of the olefin polymers as a primary reaction product, the essential conditions will be considered from the standpoint of this reaction. As mentioned above, a substantially anhydrous hydrofluoric acid is an essential requirement. The ratio of hydrofluoric acid to olefin monomer must be high, at all times greater than 1 to 1 and preferably 5 or 10 to 1 or higher. In a large scale operation, particularly on a continuous basis, the preferred mode of operation is to add the olefin monomer to the catalyst-hydrocarbon mixture while agitating the mixture in the manner utilized in the present day conventional alkylation processes.

The effect of temperature varies widely with the particular olefin to be reacted. In the case of ethylene, increasing temperatures over the range of from $-15°$ C. to $+75°$ C. merely served to increase the amount of ethyl fluoride formed, and where the reaction rate of ethylene approached a reasonable value, the fluoride was the predominant product. Hydrofluoric acid alone seemed incapable of satisfactorily effecting the polymerization of this olefin. With propylene, the effect of temperature on the nature of the reaction was very sharp. In raising the temperature from $-5°$ C. to $+10°$ C., the reaction changes sharply from one of predominantly the formation of iso-propyl fluoride, to one of almost entirely polymerization. The exact temperature at which isopropyl fluoride formation, as an end product, is largely eliminated varies about plus or minus 5° C. from $+10°$ C. with the hydrofluoric acid concentration and acid-olefin monomer ratio. On the other hand, with olefins of 4 or more carbon atoms, I have not been able to observe any appreciable formation of low boiling alkyl fluorides down to low temperatures at which the reaction rate becomes slow. For example at a temperature of $-20°$ C., polymerization is still the major reaction. Polymerization represents the chief reaction for propylene as well as the olefins of 4 or more carbon atoms through the ordinary as well as the moderately elevated temperature levels up to, say, 200° C., although temperatures between about $+10°$ and $+60°$ C. are preferred for propylene, and about −20° and +60° C. are preferred for olefins of 4 or more carbon atoms.

As mentioned previously, the acid to olefin monomer ratio is an important factor in securing the desired polymerization reaction. Since an important object of my invention is to secure not only a polymerization reaction, but to also recover the two types of product, i. e., the saturated hydrocarbons and the highly unsaturated, terpene-like products soluble in the catalyst, the relative proportions of acid to total hydrocarbons in the reaction zone is important. In the absence of inert solvents an amount of acid of from about 20% up to about 400% by weight of the olefinic hydrocarbons may be utilized, or expressed in another way from 25% to 500% by weight of olefins may be added to the hydrofluoric acid with separation possible into readily separable layers. Preferably the amount of olefins added is from 33⅓% to 200% by weight. Where inert solvents are utilized, the amount of olefin which may be added to the acid-hydrocarbon mixture will largely depend upon the relative proportion of acid and inert hydrocarbon solvent, and is normally within the range of from 16⅔% up to about 200% by weight of the amount of acid, with amounts from 25% to 150% by weight preferred. The difference in preferred ranges is due to the fact that the inert solvent does not react to produce larger molecules (which as a result of hydrogen exchange distribute themselves between the acid and hydrocarbon phases) but remains as a distinct hydrocarbon phase. Hence, assuming that the amount of solvent is at least as great as the amount of acid, the minimum amount of olefins necessarily added, where solvents are employed, is generally reduced by about one-half to obtain satisfactory conditions of layer separation. Similarly, especially where it is desirable to use relatively large amounts of inert solvent, the maximum amount of olefin which may be added to the catalyst with satisfactory separation after the reaction has been completed, is reduced.

The process may be carried out, in either the presence or absence of solvents, under conditions similar to those utilized in carrying out alkylation reactions, or the conditions used are what might be termed "alkylation conditions" with respect to pressure, temperature (within the ranges indicated), reaction system, mode of introduction of reactants and the like.

Since the reaction gives off a substantial amount of heat, it is usually desirable to provide suitable cooling means in order to maintain the temperature within the preferred limits. Usually the reaction will be carried out so that the hydrogen fluoride catalyst is in liquid phase, and, therefore, in such cases sufficient pressure should be provided to maintain the catalyst in liquid phase. However, such procedure requires only sufficient pressure to maintain the inert solvent, if any, and the hydrogen fluoride in the liquid state. The olefin is then passed through the well agitated liquid at such a rate that it all reacts to higher boiling hydrocarbons, wherefore no rise in pressure results. Accordingly, relatively low pressures can be used.

Since, in addition to the initial olefin polymerization, I desire to allow hydrogen exchange reactions to occur within the original polymer products, further contacting of the reaction mixture with the acid catalyst is desirable. The amount of residence time, of the hydrocarbon products in contact with the catalyst, required to achieve substantial or nearly complete saturation of the acid immiscible hydrocarbons varies with the reaction conditions and the particular olefin monomer being processed. At normal room temperature levels, total residence times of from 30 minutes to three hours are generally satisfactory although these residence times are not intended as limiting on the operation of my process. The residence time is correlatable with the reaction temperature and the degree of saturation of the hydrocarbon layer products desired.

Referring to the drawing one possible form of carrying out the process of my invention is diagrammatically illustrated, which enables the continuous production of the conjunct polymer products. According to the form illustrated, the reaction is carried out in the presence of a normal paraffin hydrocarbon solvent.

To an emulsion of hydrofluoric acid and an inert solvent such as normal butane, obtained in the manner hereinafter described, in a coil 1 in temperature control zone 2, an olefin is introduced through line 3 provided with a suitable pump 4. The contact time of the olefin charge with the acid catalyst should be sufficiently long within the temperature control zone 2 so that a substantial portion of the olefin reacts therein to form the olefin dimers, trimers, etc. From coil 1, the olefin polymer, solvent-catalyst mixture is led through lines 5 and 7 to reactor 8 provided with a suitable agitator 9, wherein the emulsion is maintained for the desired residence time to permit the polymerization reactions to become completed and allow hydrogen exchange to occur between the olefin polymers as previously described. Product mixture is continuously withdrawn from the reactor 8, and sent through line 10 to settling tank 15 wherein the emulsion is allowed to stratify into an upper hydrocarbon phase and a lower acid catalyst phase. From the lower portion of the settling tank, catalyst phase is continuously withdrawn through line 16, and sent to fractionator 17, wherein the major portion of the hydrofluoric acid is distilled off from the highly unsaturated terpene-like polymers contained therein. The hydrofluoric acid vapors overhead from fractionator 17 are then sent through line 18 to condenser 19, collected in receiver 20, and returned through lines 21, 22 and 23 to reaction coil 1. Line 23 is provided with a suitable pump 24 to provide the necessary acid circulation. Make-up hydrofluoric acid is admitted, as necessary, to line 22 through line 25, provided with a control valve 26. The highly unsaturated polymer is removed from the bottom of the fractionator 17, and sent through line 30, provided with a suitable pump 31, to acid stripper 32. In acid stripper 32, the final traces of hydrofluoric acid are removed from the unsaturated polymer product by scrubbing the polymer with a hot inert gas such as nitrogen or methane introduced through line 33. This includes not only hydrofluoric acid present as such, but also hydrogen fluoride which may have added to double bonds in the unsaturated polymer and is driven off by moderate heating. The overhead from the stripper 32 is sent to condenser 34 through line 35, and any condensable material, principally hydrofluoric acid, collected in receiver 36, provided with a suitable vent 37, and recovered from line 38. Any hydrogen fluoride escaping with the vent gases may be recovered by any suitable means. The unsaturated polymer product is recovered from the bottom of the acid stripper through line 39.

The hydrocarbon phase is withdrawn from the top of settling tank 15, and sent through line 45 to solvent stripper 46. Solvent vapors are taken off overhead, sent to a suitable condenser (not shown) through line 47, collected in a receiver (not shown), and returned through line 48, provided with a suitable pump 49, to line 23, wherein the solvent is emulsified with the hydrofluoric acid recycle returning through line 22, and returned to reaction coil 1. A line 50 is provided, connecting lines 48 and 7, and control valves 51 and 52 are provided in lines 50 and 48, respectively, so that any desired portion of the recycle solvent may be returned only to reactor 8, rather than being emulsified with the acid recycle and sent through reaction coil 1. The bottoms from the solvent stripper are withdrawn through line 55, and sent to heating coil 56 in a suitable heater 57, wherein they are preheated to a temperature which will decompose the fluorides. Although the major portion of the hydrofluoric acid dissolved in the hydrocarbon layer and most of the readily decomposable organic fluorides, which may be formed in small amounts in the reaction, are removed from the hydrocarbons as hydrofluoric acid in the solvent stripper and returned to the reaction zone, some hydrofluoric acid or hydrofluoric acid forming compounds remain in the saturated hydrocarbon product. These fluorine compounds are removed by passing the preheated material from coil 56 through line 58 to scrubber 59, wherein the liquid is countercurrently scrubbed with an aqueous alkali solution. The scrubbing solution is removed from the bottom of the scrubber through line 60, and recirculated through line 61 by means of pump 62. The scrubbing solution may be withdrawn in part continuously, or from time to time, and fresh scrubbing medium supplied to line 61 through line 63, provided with a suitable control valve 64. The scrubbed hydrocarbon liquid is removed overhead through line 70, and sent to fractionating column 71 to be separated into the desired fractions. The overhead vapors in line 72 are sent to a condenser 73, and the liquid condensate recovered in receiver 74, provided with a suitable vent 75 for noncondensable gases. A portion of the condensate in receiver 74 is recycled through line 76, provided with a pump 77, to the upper portion of the column as reflux and the remainder withdrawn through valved line 78. This material consists of substantially saturated hydrocarbons boiling in the gasoline range. Vapors withdrawn from near the center of the column through line 80, condensed in condenser 81, and collected in receiver 82, are largely kerosene boiling range saturated hydrocarbons and are drawn off for recovery through valved line 83. A portion of this kerosene boiling material may be returned to the column through line 84, by means of pump 85, as reflux. The material coming off the bottom of column through line 86 is a heavy predominantly saturated hydrocarbon material and can be further fractionated under vacuum if necessary to produce a valuable lubricating oil material.

Many modifications of the process illustrated will be readily apparent to those skilled in the art. For example vacuum stripping of the hydrofluoric acid from the unsaturated polymer may be substituted for the step of scrubbing with an inert gas.

Inasmuch as the conditions utilized in my process resemble what might be called "alkylation conditions," it is of importance that where a solvent is used, that it should not contain any large amount of isoparaffins, especially the light isoparaffins, isobutane and isopentane. Were appreciable amounts of light isoparaffins present with the hydrofluoric acid at the point of olefin monomer introduction, alkylation would set in as a competing reaction. For this reason, as discussed herein, inert solvents such as the normal paraffin are used. In continuous operation, this produces a distinction in the preferred mode of operation over that utilized in the conventional continuous alkylation process. Since the saturated product formed from the olefin polymers contains branched chain hydrocarbons (the nature of which depends upon the particular olefin being processed) I prefer not to recirculate the product mixture to the point of olefin introduction in order to avoid alkylation of isoparaffinic polymer products. One way of accomplishing this is shown in the drawing, wherein the initial olefin addition is to product-free acid, and the additional contacting at the longer residence time is effected in a separate reactor. This does not mean that all or part of the product mixture could not be recirculated and the olefin introduced into the product-acid emulsion, since any alkylation that occurs does no harm, but merely increases the amount of heavier saturated hydrocarbons formed. Also, the isoparaffins initially formed are largely those of six or more carbon atoms (depending upon the olefin and the extent of polymerization).

For the purpose of further illustrating the invention, the following examples are given; however, it is to be understood that the invention is not to be limited by the specific details thereof as there may be variations therefrom without departing from the scope of the invention.

*Example 1*

168 parts by weight of normal butene were added over a period of about four hours to 300 parts by weight of essentially anhydrous hydrogen fluoride, and while maintained in the liquid phase, were subjected to continuous and vigorous agitation. A noticeable temperature rise occurred during the addition of the olefin which necessitated cooling the mixture to maintain an average temperature of about 25° C. After completing the addition of olefin, agitation was discontinued, and the two liquid phases, i. e., the saturated hydrocarbon phase and the unsaturated hydrocarbon-hydrofluoric acid phase, allowed to separate. The two phases were then separately recovered and the saturated liquid hydrocarbon phase fractionated to obtain the gasoline-range material. The weight ratio of the product in the upper layer to that in the lower layer was 1.23. 40.3% by weight of the total product from the saturated hydrocarbon layer distilled in the range 40° to 220° C., and was composed principally of saturated hydrocarbons as shown below by the physical properties and bromine numbers of the various fractions:

| B. pt., °C. | $N_D^{20}$ | $d^{20/4}$ | $\delta 20$ | Br. No. |
|---|---|---|---|---|
| 40–140 | 1.3911 | 0.689 | 103.4 | 0.6 |
| 140–180 | 1.4110 | 0.730 | 100.5 | 2.3 |
| 180–220 | 1.4231 | 0.754 | 102.3 | 4.1 |

The hydrofluoric acid phase was distilled to separate the hydrogen fluoride from the unsaturated hydrocarbons associated with it. Practically all of the hydrogen fluoride was recovered from the mixture by heating to about 100° C. The remaining product was composed principally of high boiling unsaturated hydrocarbons having physical and chemical properties similar to terpene hydrocarbons of the cyclo-diolefinic series. About 18% of this product was distillable with steam and had the following properties: bromine number, 130; $N_D^{20}$, 1.4760; $d^{20/4}$, 0.860; b. pt. (approx.) 70°–144° C. at a pressure of 19 mm. of mercury.

Example 2

66.8 parts by weight of normal butene were added over a period of about four hours and twenty minutes to an agitated mixture of 646 parts by weight of propane and 101 parts by weight of hydrogen fluoride. The products were recovered as in Example 1. 52.0% by weight of the total product from the hydrocarbon layer distilled in the range of 40° to 220° C., and was composed principally of saturated hydrocarbons as shown by the physical properties and bromine numbers of the various fractions, i. e.:

| B. pt., °C. | $N_D^{20}$ | $d^{20/4}$ | $\delta 20$ | Br. No. |
|---|---|---|---|---|
| 40–140 | 1.4042 | 0.717 | 108.1 | 4.4 |
| 140–180 | 1.4185 | 0.743 | 105.8 | 4.8 |
| 180–220 | 1.4310 | 0.764 | 109.0 | 4.9 |

The product from the hydrofluoric acid phase was steam-distilled, yielding 11.8% of a yellow oil having the following properties: bromine number, 193; $N_D^{20}$, 1.4770; $d^{20/4}$, 0.849.

Example 3

The experiment given in Example 1 was repeated in the presence of a 5:1 mol ratio of normal butane to normal butene by adding 149 parts by weight of normal butene to a vigorously agitated mixture of 777 parts by weight of normal butane and 300 parts by weight of hydrogen fluoride. The products were recovered as in Example 1. 149 parts by weight of normal butene yielded 103 parts by weight of saturated product and 39 parts by weight of unsaturated hydrocarbon product, or the ratio of 2.64 to 1. 56.4% by weight of the total product from the hydrocarbon layer distilled in the range 40° to 220° C., and was composed principally of saturated hydrocarbons as shown by the physical properties and bromine numbers of the various fractions, i. e.:

| B. pt., °C. | $N_D^{20}$ | $d^{20/4}$ | $\delta 20$ | Br. No. |
|---|---|---|---|---|
| 40–140 | 1.4018 | 0.710 | 91.5 | 6.5 |
| 140–180 | 1.4152 | 0.735 | 97.5 | 8.0 |
| 180–220 | 1.4260 | 0.772 | 99.0 | 12.0 |

The product from the hydrofluoric acid phase gave 48.8% of material distilling in the range of 70°–144° C. (at 19 mm. of mercury). The properties of this distillate were as follows: bromine number, 189; $N_D^{20}$, 1.4802; $d^{20/4}$, 0.855.

Example 4

149 parts by weight of isobutene were added over a period of three and one-half hours to a vigorously agitated mixture of 777 parts by weight of normal butane and 300 parts by weight of hydrogen fluoride. The products were recovered as in Example 1. 55.0% by weight of the total product from the hydrocarbon layer distilled in the range 40° to 220° C., and was composed principally of saturated hydrocarbons as shown by the physical properties and bromine numbers of the various fractions, i. e.:

| B. pt., °C. | $N_D^{20}$ | $d^{20/4}$ | $\delta 20$ | Br. No. |
|---|---|---|---|---|
| 40–140 | 1.4000 | 0.708 | 97.3 | 4.3 |
| 140–180 | 1.4120 | 0.730 | 98.9 | 19.4 |
| 180–220 | 1.4262 | 0.760 | 102.6 | 29.1 |

The product from the hydrofluoric acid phase gave 19.8% of material distilling in the range of 70°–144° C. (at 19 mm. of mercury). The properties of this distillate were as follows: bromine number, 212; $N_D^{20}$, 1.4716; $d^{20/4}$, 0.858.

Example 5

398 parts by weight of propylene were added over a period of about two hours to a vigorously agitated mixture of 276 parts by weight of normal pentane and 585 parts by weight of hydrogen fluoride. The products were recovered as in Example 1. 31.0% by weight of the total product from the hydrocarbon layer distilled in the range of 40° to 220° C., and was composed principally of saturated hydrocarbons as shown by the physical properties and bromine numbers of the various fractions, i. e.:

| B. pt., °C. | $N_D^{20}$ | $d^{20/4}$ | $\delta 20$ | Br. No. |
|---|---|---|---|---|
| 40–140 | 1.3941 | 0.694 | 99.5 | 3.9 |
| 140–180 | 1.4097 | 0.728 | 102.0 | 1.2 |
| 180–220 | 1.4212 | 0.748 | 100.0 | 1.2 |

Two such experiments gave 176.5 parts by weight of hydrocarbon from the hydrofluoric phase, which was then vacuum-distilled to yield 15.6 parts by weight of distillate and 161 parts by weight of residue. The vacuum-distillation residue so obtained was then dissolved in 409 parts by weight of cyclohexane and hydrogenated over active nickel at 164° C. and 2375 pounds per square inch hydrogen pressue to yield a viscous yellow oil. The properties of the original vacuum-distillation residue and the hydrogenated material are given below for comparison:

| | $N_D^{20}$ | $d^{20/4}$ | $\delta 20$ | Br. No. |
|---|---|---|---|---|
| Vacuum distillation residue | 1.5122 | 0.888 | | 222 |
| Hydrogenated V. D. residue | 1.4934 | 0.900 | 99.7 | 65 |

The hydrogenated vacuum-distillation residue had an apparent molecular weight of 351 and a viscosity of 3333.3 Saybolt Universal units at 100° F.

Example 6

The experiment given in Example 1 was repeated at a temperature of −18° C. controlled to plus or minus 2° C. In this case, the weight ratio of the product in the upper layer to that in the lower (hydrogen fluoride) layer was 4.69 as compared with the value of 1.23 obtained at a temperature of 25° C. in the absence of any solvent. No discernible amount of lower boiling alkyl fluorides were formed, indicating that polymerization was still the predominant reaction. In contrast to the result obtained in Example 1 at a higher temperature, only 14.5% by weight of the total product from the hydrocarbon layer distilled in the range 40° to 200° C., indicating that lower temperatures favor the formation of larger amounts of the heavier hydrocarbons. This distillate was composed principally of saturated hydrocarbons as shown by the physical properties and bromine numbers of the fractions:

| B. pt., °C. | $N_D^{20}$ | $d^{20/4}$ | $\delta 20$ | Br. No. |
|---|---|---|---|---|
| 40-180 | 1.4071 | 0.721 | 111.0 | 0.85 |
| 180-220 | 1.4249 | 0.756 | 104.0 | 0.52 |

The total top layer product (before fractionation) contained 2.5 percent by weight of combined fluorine, the majority of which was liberated as hydrogen fluoride during the distillation step.

*Example 7*

The experiment in Example 3, in which a 5:1 mol ratio of normal butane to normal butene was employed, was repeated at a temperature of 54° C. The products were recovered as in Example 3, yielding 47 parts by weight of unsaturated hydrocarbons from the hydrofluoric acid layer and 113 parts by weight of substantially saturated hydrocarbons boiling above normal butane from the hydrocarbon layer. 70.9 percent by weight of the total product from the hydrocarbon layer distilled in range 40° to 220° C. and had the following properties:

| B. pt., °C. | $N_D^{20}$ | $d^{20/4}$ | $\delta 20$ | Br. No. |
|---|---|---|---|---|
| 40-140 | 1.3948 | 0.700 | 99.0 | 1.25 |
| 140-180 | 1.4108 | 0.728 | 94.1 | 1.68 |
| 180-220 | 1.4228 | 0.751 | 102.0 | 3.61 |

Even at this relatively high temperature there was no evidence of reaction of the normal butane with the olefin. The weight of total products recovered (160 parts by weight) was equivalent to the weight of normal butenes added within the limits of accuracy of the experiment. Furthermore, substantially all of the normal butane (770 parts by weight) was recovered unchanged. Careful fractionation of the gasoline boiling range material from the hydrocarbon layer revealed no plateaus in the region of the octanes and therefore furnished no evidence for alkylation of normal butane with normal butene.

In comparing this experiment with that given in Example 3, which was conducted at 25° C., it will be seen that the higher temperature favored a lower ratio of saturated hydrocarbon product to unsaturated hydrocarbon product (2.40 at 54° as compared with 2.64 at 54° C.), and a higher percentage of gasoline boiling range material in the saturated hydrocarbon product (70.9% at 54° as compared with 56.4% at 25° C.). A similar effect of temperature has been noted for the propylene polymerization reaction where the experiments were conducted in the absence of a paraffin hydrocarbon solvent as disclosed in examples included in my copending application Serial Number 532,489, filed April 24, 1944, wherein the conjunct polymerization of propylene is claimed.

The total top layer product (before fractionation) contained only 0.0756 percent by weight of combined fluorine as compared with 2.5 percent found in the product from Example 6.

Since the reaction product in the acid layer is composed of a very substantial portion of terpene-like hydrocarbons, it can be appreciated readily that efficient recovery of such fraction is necessary for any practical operation. Accordingly, from the above examples, it can be seen that my process permits efficient recovery of all the reaction product, whereas prior art processes have failed to do so and because of this failure have received little attention.

The terpene-like unsaturated hydrocarbons form a valuable product having many potential uses, primarily as a raw material for the manufacture of other products. Thus, for example, this product may be steam-distilled to yield a suitable fraction that may serve as a turpentine substitute, or other solvent-type material, or the product or fractions thereof may be hydrogenated; as, for example, the non-steam-distillable residue (or vacuum-distillation residue which may be considered as an equivalent) may be hydrogenated to form material boiling in the lubricating oil range. Further, hydrocarbons of this product may be dehydrogenated to aromatics, or, still further, they may be reacted with a suitable resinfying agent to form desirable resins.

Therefore, it is particularly interesting to observe that an inert solvent in the reaction has an effect on the terpene-like product as well as on the saturated hydrocarbon product. In order to show the effect of an inert solvent, the results of several runs using different amounts of solvent with the same olefin, n-butene, are given below. All runs were made at about 25° C. with a constant mol ratio of hydrogen fluoride to total n-butene of 5:1.

| | Mol ratio of n-butane to n-butene | | | |
|---|---|---|---|---|
| | 5.04 | 1.00 | 0.91 | No n-butane |
| Product in upper layer: | | | | |
| Wt. ratio to product in lower layer | 2.64 | 1.67 | 1.46 | 1.23 |
| Wt. percent Distilling up to 220° C | 56.4 | 45.9 | 44.6 | 40.3 |
| Product in lower layer: | | | | |
| Wt. percent distilling up to 144° C. at 19 mm | 48.8 | 23.7 | 21.3 | 17.7 |
| Properties of vacuum distillate: | | | | |
| Refractive index $N_D^{20}$ | 1.4802 | 1.4729 | 1.4640 | 1.4760 |
| Density $d^{20/4}$ | 0.855 | 0.863 | 0.835 | 0.860 |
| Specific dispersion $\delta 20$ | 138.1 | 119.4 | 119.7 | 104.8 |

Therefore, it will be seen very clearly from the above data that larger quantities of gasoline-boiling saturated hydrocarbons and larger quantities of vacuum-distillate terpene-like hydrocarbons are obtained when an inert solvent (n-butane) is used, and that the increase in quantity of these products is larger, the larger the amount of inert solvent used. Accordingly, by using suitably large ratios of inert solvent to olefin the greater part of the products will be composed of comparatively low molecular weight hydrocarbons.

The effect of solvent is further illustrated in the examples and specification in my copending application Serial Number 532,489 filed April 24, 1944, referred to above.

Many modifications of my invention will be apparent to those skilled in the art, and therefore only such limitations should be imposed as are indicated in the appended claims.

I claim:

1. A process for the polymerization of an olefin of more than 3 carbon atoms which comprises adding from about 16⅔ to about 500 parts by weight of the olefin to about 100 parts of essentially anhydrous hydrofluoric acid as a catalytic agent at a temperature less than 200° C. at a rate such that the relative proportion by weight of olefin monomer in the reaction mixture is less than that of the hydrofluoric acid, agitating the resulting mixture for a period of time sufficient to allow the saturation of a major proportion of the acid catalyst immiscible polymer products to occur, separating the acid immiscible hydrocarbon phase containing saturated hydrocarbons from the acid catalyst phase containing highly unsaturated hydrocarbon polymers, and separately recovering the hydrocarbons from each of said phases.

2. The process of claim 1 in which the olefin is a butene.

3. The process of claim 1 in which the reaction is carried out at a temperature between —20° C. and +60° C.

4. The process for the conjunct polymerization of an olefin of more than 3 carbon atoms to produce saturated hydrocarbon polymers and terpene-like unsaturated hydrocarbons which comprises contacting the monoolefin with a catalyst consisting essentially of hydrofluoric acid of about 90 to 100 percent concentration, correlating the amount of hydrofluoric acid, the reaction temperature and time to effect polymerization of the olefin as the principal reaction of the process and allow hydrogen exchange between the olefin polymers to occur to form saturated hydrocarbon material and a highly unsaturated hydrocarbon material, separating the reaction mixture into an acid phase and a hydrocarbon phase, recovering saturated hydrocarbon products having more carbon atoms than the olefin from the hydrocarbon phase, and recovering terpene-like unsaturated hydrocarbons from the acid phase.

5. The process of claim 4 in which the olefin is contacted with the acid in the presence of a normal paraffin hydrocarbon at a temperature of from —20° to +60° C.

6. The process of claim 4 in which the monoolefin is added to the acid at a rate such that the weight ratio of acid to olefin monomer is maintained at a value of at least 10 to 1.

7. A process for the polymerization of an olefin of more than 3 carbon atoms which comprises adding from about 33⅓ to about 200 parts by weight of the olefin to about 100 parts by weight of essentially anhydrous hydrofluoric acid as a catalytic agent at a temperature of from about —20° C. to about 60° C. at a rate such that the relative proportion of olefin monomer by weight in the reaction mixture is less than that of the hydrofluoric acid, agitating the resulting mixture for a period of time sufficient to allow the saturation of a major proportion of the acid catalyst immiscible polymer products to occur, separating the acid immiscible hydrocarbon phase containing saturated hydrocarbons from the acid catalyst phase containing highly unsaturated hydrocarbon polymers, and separately recovering the hydrocarbons from each of said phases.

8. The process of claim 7 in which the olefin is a butene.

9. A process for the polymerization of an olefin of more than 3 carbon atoms which comprises adding from about 16⅔ to about 200 parts of the olefin by weight to 100 parts by weight of essentially anhydrous hydrofluoric acid in admixture with at least as much normal paraffin hydrocarbon as acid at a temperature of from about —20° C. to about +60° C. at a rate such that the ratio of acid to olefin monomer is at least 5 to 1, allowing the hydrocarbons to remain in contact with the acid catalyst for a residence time sufficient to effect polymerization of the olefin as the principal reaction of the process and allow hydrogen exchange between the primary polymers to occur to form saturated hydrocarbon material and a highly unsaturated hydrocarbon material, separating the reaction mixture into an acid phase and a hydrocarbon phase, recovering the hydrocarbon products from each of said phases.

10. In a process for the polymerization of olefins of more than three carbon atoms to produce saturated hydrocarbons and terpene-like unsaturated hydrocarbons the steps of (1) introducing the olefin monomer into a liquid mixture of normal paraffin hydrocarbon and hydrofluoric acid maintained at a temperature of less than 200° C. at a rate such that the amount of olefin monomer by weight at any time is less than one-tenth the amount of hydrofluoric acid, (2) transferring the mixture of primary polymerization products and acid catalyst to a reaction zone wherein the mixture is agitated and maintained at a temperature of less than 200° C. and allowing further contacting of the acid catalyst and olefin including primary polymerization products to occur during a residence time sufficient to allow substantial saturation of acid immiscible olefin polymers, (3) withdrawing reaction mixture containing hydrofluoric acid and hydrocarbons including olefin reaction products and any unreacted olefin monomer from said reaction zone, (4) passing the mixture so withdrawn to a separation zone for separation into a lower acid phase and an upper hydrocarbon phase, (5) withdrawing the acid phase and vaporizing hydrofluoric acid from the terpene-like unsaturated hydrocarbons therein, (6) condensing and returning at least part of the hydrofluoric acid to the point of said olefin introduction, and (7) withdrawing the hydrocarbon phase and recovering predominantly saturated C₅ plus hydrocarbon products therefrom.

11. A process for the production of paraffinic hydrocarbons from olefins of more than three carbon atoms which comprises adding about 16⅔ to about 500 parts by weight of the olefin to about 100 parts of essentially anhydrous hydrofluoric acid as a catalytic agent at a temperature less than 200° C. at a rate such that the relative proportion by weight of olefin monomer in the reaction mixture is less than that of the hydrofluoric acid to effect polymerization of the olefins, agitating the resulting mixture for a period of time sufficient to allow saturation of a major proportion of the polymer products to occur to form acid immiscible paraffinic hydrocarbons therefrom, separating and recovering the paraffinic hydrocarbon products from the acid catalyst.

12. The processes of claim 11 in which the olefin is a butene.

13. A process for the production of paraffinic hydrocarbons from olefins of more than three carbon atoms which comprises adding from about 16⅔ to about 200 parts by weight of the olefin to about 100 parts of essentially anhydrous hydrofluoric acid as a catalytic agent in admixture with at least as much normal paraffin by weight as hydrofluoric acid at a temperature less than 200° C. at a rate such that the relative proportion by weight of olefin monomer in the reaction mixture is less than that of the hydrofluoric acid, agitating the resulting mixture for a period of time sufficient to allow the saturation of a substantial portion of the polymer products to occur to form acid immiscible paraffinic hydrocarbons therefrom, separating and recovering paraffinic hydrocarbon products from the acid catalyst.

14. A process for the conjunct polymerization of mono-olefins of more than three carbon atoms to produce saturated hydrocarbon polymers and terpene-like unsaturated hydrocarbons which comprises contacting the mono-olefin in admixture with an inert solvent for saturated hydrocarbons with a catalyst consisting essentially of hydrofluoric acid of about 90 to 100% concentration at a temperature less than 200° C., separating the reaction mixture into two phases, recovering the hydrocarbon phase containing the saturated hydrocarbon polymers, vaporizing the hydrofluoric acid from the catalyst phase and recovering the terpene-like unsaturated hydrocarbons remaining after removal of the hydrofluoric acid.

15. In a process for the polymerization of butene to produce therefrom saturated hydrocarbons and terpene-like unsaturated hydrocarbons the steps of (1) introducing butene monomer into a mixture of a normal paraffin hydrocarbon of less than 5 carbon atoms and liquid hydrofluoric acid maintained at a temperature between about −20° C. and +60° C. at a rate such that the amount of butene monomer by weight at any time is less than one-tenth the amount of hydrofluoric acid, (2) transferring the mixture of primary polymerization products and acid catalyst to a reaction zone wherein the mixture is agitated and maintained at a temperature between about −20° C. and +60° C. and allowing further contacting of the acid catalyst and butene, including primary polymerization products, to occur during a residence time sufficient to allow substantial saturation of acid immiscible olefin polymers, (3) withdrawing reaction mixture containing hydrofluoric acid and hydrocarbons including the olefin reaction products and any unreacted olefin monomer from said reaction zone, (4) passing the mixture so withdrawn to a separation zone for separation into a lower acid phase and an upper hydrocarbon phase, (5) withdrawing the acid phase and vaporizing the hydrofluoric acid from the terpene-like unsaturated hydrocarbons therein, (6) condensing and returning at least a part of the hydrofluoric acid to the point of said butene introduction, (7) withdrawing the hydrocarbon phase and separating and recovering predominantly saturated $C_{5+}$ hydrocarbons therefrom, and (8) recycling the normal paraffin hydrocarbons of less than five carbon atoms separated from the hydrocarbon products in step 7 to step 1.

CARL S. KUHN, Jr.